(12) United States Patent
Tsai et al.

(10) Patent No.: US 8,024,750 B2
(45) Date of Patent: Sep. 20, 2011

(54) LIFT DEVICE OF A SLOT-IN DISK DRIVE

(75) Inventors: Yao-Ching Tsai, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 369 days.

(21) Appl. No.: 12/478,784

(22) Filed: Jun. 5, 2009

(65) Prior Publication Data

US 2010/0077412 A1   Mar. 25, 2010

(30) Foreign Application Priority Data

Sep. 23, 2008   (TW) ................................ 97136585 A

(51) Int. Cl.
*G11B 17/03* (2006.01)
*G11B 17/04* (2006.01)
(52) U.S. Cl. ......... 720/706; 720/622; 720/623; 720/713
(58) Field of Classification Search ................... 720/706
See application file for complete search history.

(56) References Cited

U.S. PATENT DOCUMENTS

| | | | | |
|---|---|---|---|---|
| 6,754,903 | B2* | 6/2004 | Kato | 720/713 |
| 7,487,520 | B2* | 2/2009 | Omori et al. | 720/706 |
| 7,500,253 | B2* | 3/2009 | Inoue | 720/620 |
| 7,627,875 | B2* | 12/2009 | Aoyama et al. | 720/651 |
| 7,793,314 | B2* | 9/2010 | Yamamoto et al. | 720/623 |
| 7,805,737 | B2* | 9/2010 | Yamada et al. | 720/622 |
| 7,814,508 | B2* | 10/2010 | Fujisawa | 720/713 |
| 2005/0015783 | A1* | 1/2005 | Fujimura | 720/604 |
| 2006/0085808 | A1* | 4/2006 | Fujimura | 720/706 |
| 2006/0143626 | A1* | 6/2006 | Hu | 720/619 |
| 2007/0011697 | A1* | 1/2007 | Kido | 720/713 |
| 2011/0088049 | A1* | 4/2011 | Huang et al. | 720/620 |

* cited by examiner

*Primary Examiner* — Son Mai
(74) *Attorney, Agent, or Firm* — Winston Hsu; Scott Margo

(57) ABSTRACT

The present invention provides a lift device of a slot-in disk drive, which includes two straight slots formed on a side of a sliding component, two sliding pins protruding from a side of base adjacent to the sliding component or protruding from a fixing plate of a casing, a cover covering with the sliding component, two guiding pins protruding from an inner surface of the cover corresponding to the two straight slots for inserting into the two straight slots respectively, an one-humped traverse slot with two ends of different heights formed on a lateral side of the cover adjacent to the sliding bolt whereinto the sliding bolt inserts, and two lifting slots separately formed on the other lateral side of the cover whereinto the two sliding pins insert.

16 Claims, 4 Drawing Sheets

(a)

(b)

(c)

LIFT DEVICE OF A SLOT-IN DISK DRIVE

BACKGROUND OF THE INVENTION

1. Field of the Invention

The present invention relates to a lift device, and more particularly, to a lift device for driving a traverse to ascend or descend so as to load or eject an optical disk in a slot-in disk drive.

2. Description of the Prior Art

Due to a trend of notebook computers becoming lighter, a height of an optical disk drive is decreased obviously and an inner space of the optical disk drive becomes smaller, so that most components of the optical disk drive have to be reduced, even to be redesigned, and it delays the development of the optical disk drive.

Please refer to FIG. 1. FIG. 1 is a sectional view of a slot-in disk drive 1 disclosed in U.S. Pat. No. 7,334,240 in the prior art. The slot-in disk drive 1 in the prior art utilizes a sliding component 2 installed beside a side of the slot-in disk drive 1 in a slidable manner. A traverse 4 is ascended and descended with guide of a limiting bar 6 by driving a sliding bolt 5 connected to the traverse 4 to move along a sliding slot 3 formed on the sliding component 2. When the traverse 4 is descended, an optical disk D is capable of being loaded and ejected by the slot-in disk drive 1. When the traverse 4 is ascended, the optical disk D is clamped and rotated by a spindle motor 6 of the traverse 4 so as to read in/out data of the optical disk D. Because the rotating optical disk D needs to be operated in a sufficient space, the sliding component 2 has a specific height for allowing the traverse 4 to move along the sliding slots 3 with a predetermined height difference so as to make sure the optical disk D can be clamped or separate from the traverse 4.

However, the slot-in disk drive 1 utilizes the sliding component 2 to drive a plurality of guiding bars for loading and ejecting the optical disk D. When a height of the slot-in disk drive 1 is decreased, an inner space of the slot-in disk drive is limited so that the sliding component 2 with the predetermined height blocks disposition of the plurality of guiding bars. In addition, when the traverse 4 is ascended and descended, a part weight of the traverse 4 is loaded on the sliding component 2 and hinders the sliding component 2 from sliding smoothly. Therefore, the conventional slot-in disk drive still has drawbacks that have to be solved.

SUMMARY OF THE INVENTION

The present invention provides a lift device installed inside a slot-in disk drive for adjusting a height of a cover by driving a sliding component so as to decrease a thickness of the slot-in disk drive.

The present invention further provides the lift device installed inside the slot-in disk drive for utilizing a casing or a base to load most weight of a traverse so as to decrease loading of the sliding component for sliding smoothly.

According to the claimed invention, the lift device includes two straight slots formed on a side of the sliding component separately and along a direction of thickness of the slot-in disk drive, two sliding pins separately protruding from a side of the base adjacent to the sliding component, and the cover with an overturned U-shape covers with the sliding component. The cover includes two guiding pins protruding from an inner surface of the cover corresponding to the two straight slots for inserting into the two straight slots respectively, an one-humped traverse slot with two ends of different heights formed on a lateral side of the cover adjacent to the sliding bolt whereinto the sliding bolt inserts, and two lifting slots separately formed on the other lateral side of the cover whereinto the two sliding pins insert. The two sliding pins are located at top ends of the two lifting slots and the sliding bolt is located at a bottom end of the traverse slot for descending the cover to a lowest height when the slot-in disk drive is standby.

According to the claimed invention, the lift device includes two straight slots formed on a side of the sliding component separately and along a direction of thickness of the slot-in disk drive, two sliding pins separately protruding from a fixing plate protruding from the casing adjacent to the other side of the sliding component opposite to the traverse, and a cover covering with the sliding component. The cover includes two guiding pins protruding from an inner surface of the cover corresponding to the two straight slots for inserting into the two straight slots respectively, an one-humped traverse slot with two ends of different heights formed on a lateral side of the cover adjacent to the sliding bolt whereinto the sliding bolt inserts, and two lifting slots separately formed on the other lateral side of the cover whereinto the two sliding pins insert.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
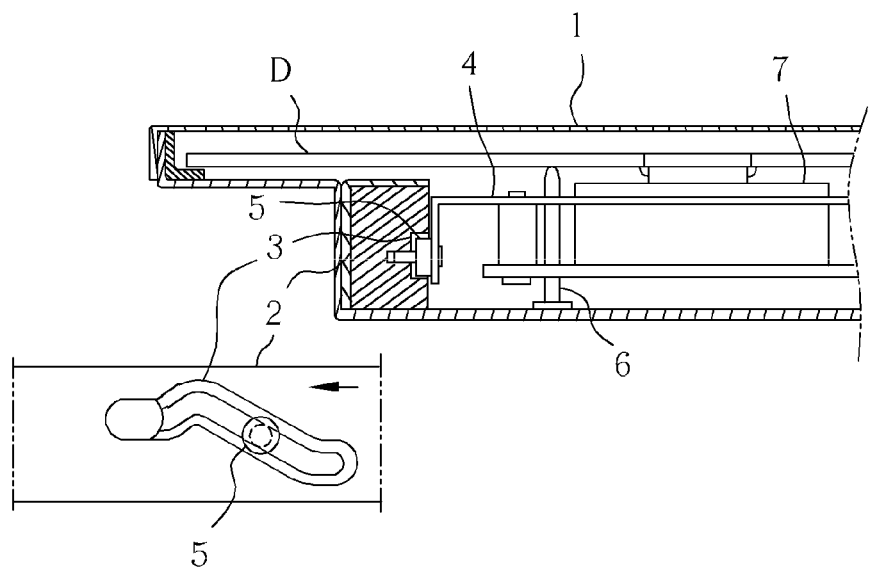
FIG. 1 is a sectional view of a slot-in disk drive in the prior art.
Figure 2:
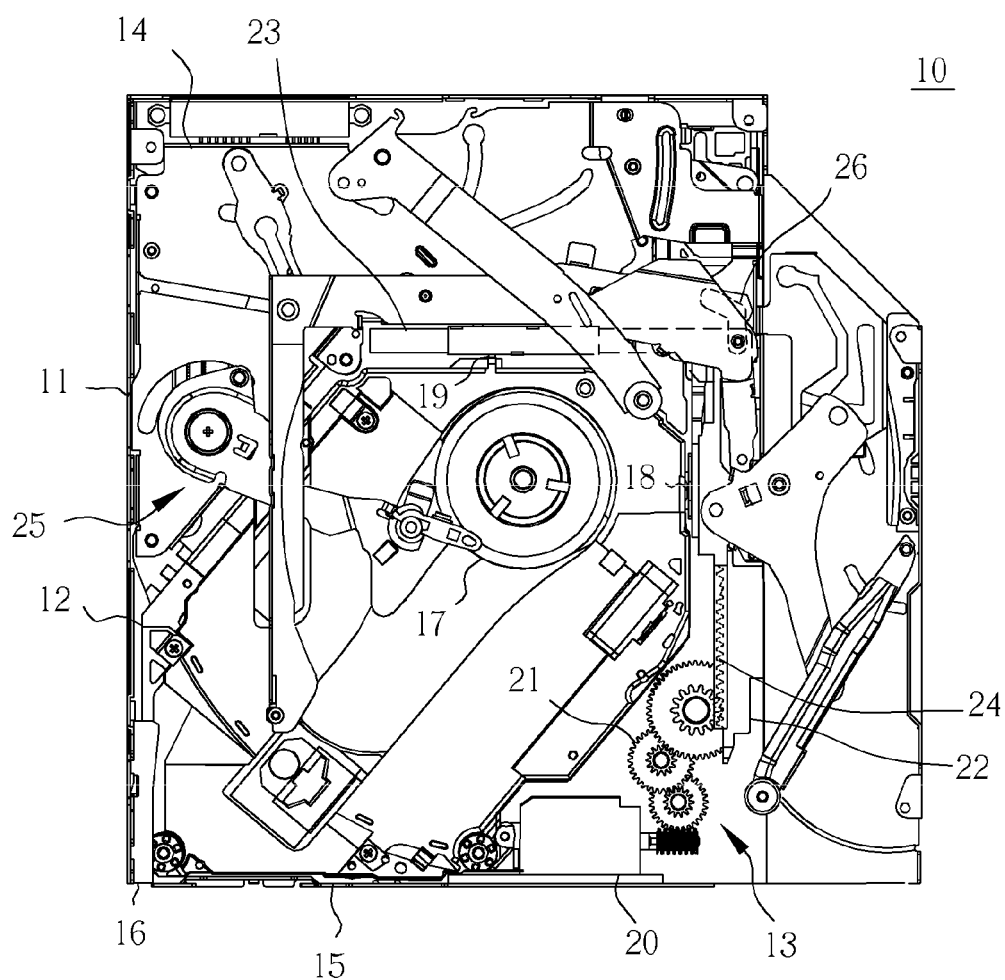
FIG. 2 is a diagram of a slot-in disk drive according to a first embodiment of the present invention.

Please refer to FIG. 2. FIG. 2 is a diagram of a slot-in disk drive 10 according to a first embodiment of the present invention. The slot-in disk drive 10 includes a casing 11, a traverse 12, a drive device 13, and a base 14. A hollow inner space is formed inside the casing 11 and an opening 15 is formed on a front end of the casing 11 for loading or ejecting an optical disk. The traverse 12 is installed inside the casing 11, and a side of the traverse 12 is pivoted to a lateral side of the casing 11 adjacent to the opening 15 so as to form a pivoted portion 16. A spindle motor 17 is installed on the other side of the traverse 12 and located at a central part of the slot-in disk drive 10. Thus, the traverse 12 can be rotated upwardly and downwardly relative to the pivoted portion 16. Two sliding bolts 18 and 19 protrude from the other side of the traverse 12 adjacent to the spindle motor 17.

The drive device 13 is installed inside the casing 11 opposite to the pivoted portion 16, which is adjacent to a lateral side of the traverse 12. The driving device 13 includes a drive motor 20, a gear set 21, a first sliding component 22, and a second sliding component 23. The driving motor 20 is installed adjacent to the opening 15 so as to drive the gear set 21. The gear set 21 is composed of several gears and engaged with a rack 24 of the first sliding component 22 for driving the first sliding component 22 to slide along the lateral side of the casing 11. The first sliding component 22 drives a set of guiding bars 25, the second sliding component 23, and the sliding bolt 18 by several guiding bars and pivoted shafts, which are not shown in figures. The second sliding component 23 is a stick structure and installed transversely inside the casing 11 adjacent to a rear of the traverse 12, wherefrom the sliding bolt 19 protrudes. An end of the second sliding component 23 is driven by a guiding slot 26 of the first sliding component 22 so as to shift transversely for driving the sliding bolt 19. The base 14 is fixed inside the casing 11 and located adjacent to the second sliding component 23 and the end of the traverse 12, wherefrom the sliding bolt 19 protrudes, for disposing the set of guiding bars 25.

Figure 3:
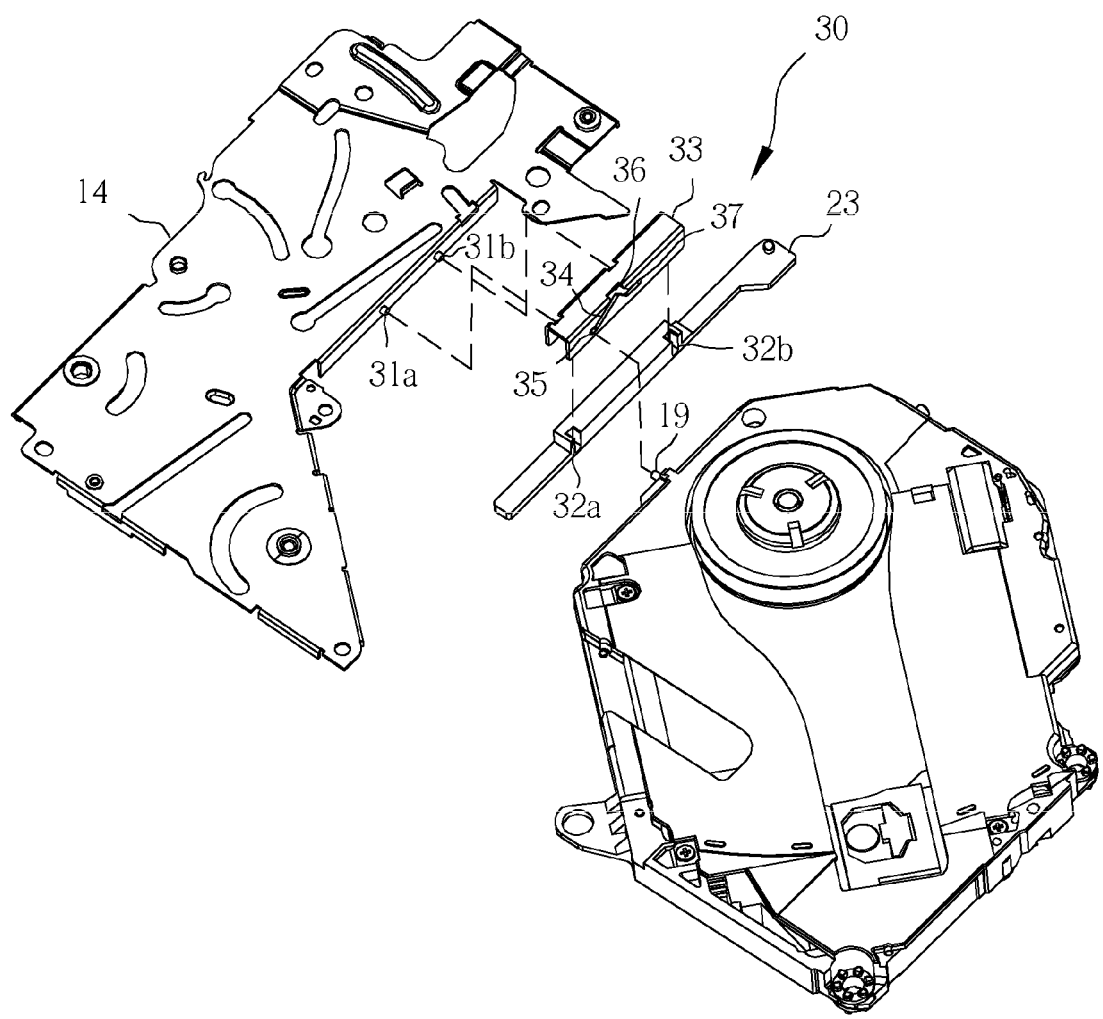
FIG. 3 is an exploded diagram of a lift device of the present invention.

The two sliding bolts 18 and 19 are driven by the first sliding component 22 and the second sliding component 23 respectively for ascending and descending the traverse 12. Because the second sliding component 23 is installed transversely close to the central part of the casing 11, a height of the second sliding component 23 might interfere with motion of the set of guiding bars 25. Please refer to FIG. 3. FIG. 3 is an exploded diagram of a lift device 30 of the present invention. The lift device 30 utilizes the second sliding component 23 for illustration in this embodiment, but the present invention is not limited herein to this embodiment. For example, the lift device 30 can further utilize the first sliding component 22 in another embodiment. Two sliding pins 31a and 31b separately protrude from a side of the base 14 adjacent to the second sliding component 23. Two straight slots 32a and a 32b are formed separately on a side of the second sliding component 23 and along a direction of thickness of the slot-in disk drive 10. A cover 33 covers with the second sliding component 23, and a cross-section of the cover 33 of the cover 33 can be an overturned U-shape for reducing space. A length of the cover 33 is greater than a distance between the two straight slots 32a and 32b. A traverse slot 34 is formed on a lateral side of the cover 33 adjacent to the sliding bolt 19. The traverse slot 34 is formed as one-humped structure with two ends of different heights whereinto the sliding bolt 19 can insert. A bottom end of the traverse slot 34 is a standby position 35 of the slot-in disk drive 10, a middle of the traverse slot 34 is a highest wedged position 36 of the slot-in disk drive 10, and a top end of the traverse slot 34 located between the bottom end and the middle is a playing position 37 of the slot-in disk drive 10.

Figure 4:
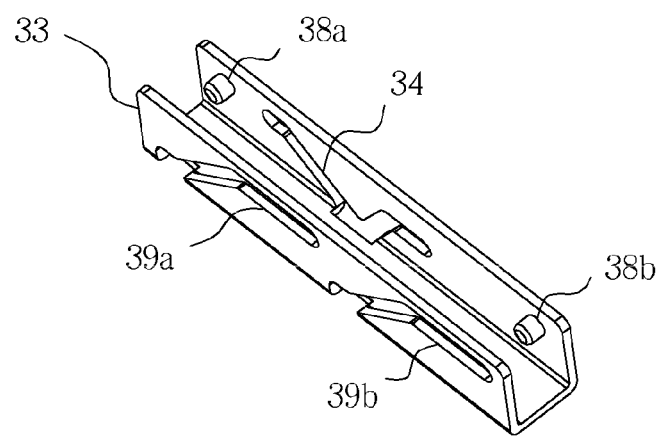
FIG. 4 is a bottom view of a cover of the present invention.

Please refer to FIG. 3 and FIG. 4. FIG. 4 is a bottom view of the cover 33 of the present invention. Two guiding pins 38a and 38b protrude from an inner surface of the cover 33 corresponding to the two straight slots 32a and 32b of the second sliding component 23 and are located at the two ends of the traverse slot 34. The two guiding pins 38a and 38b can insert into the two straight slots 32a and 32b respectively. Two lifting slots 39a and 39b are formed separately on the other lateral side of the cover 33 opposite to the traverse slot 34. Each of the lifting slots 39a and 39b is an inclined L-shaped structure, which includes a top end and a bottom end. Bottom ends of the lifting slots 39a and 39b keep the same height, whereinto the sliding pins 31a and 31b can insert.

Figure 5:
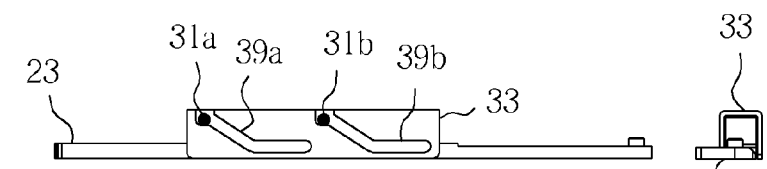
FIG. 5 is a diagram of motions of the lift device according to the first embodiment of the present invention.
Figure 5:
Figure 5:
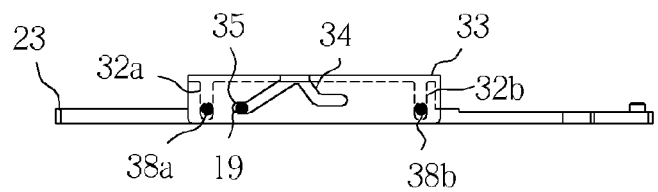
Figure 5:
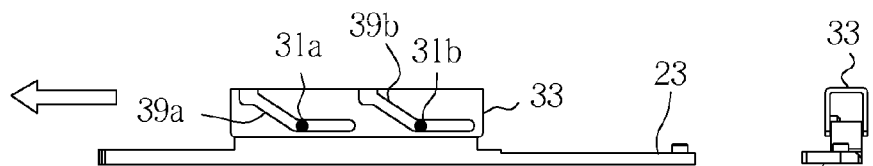
Figure 5:
Figure 5:
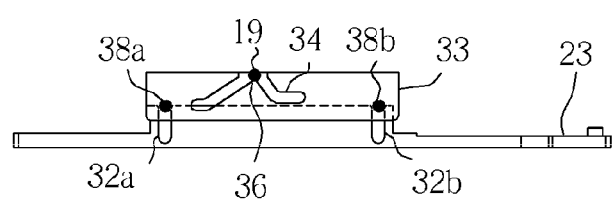
Figure 5:
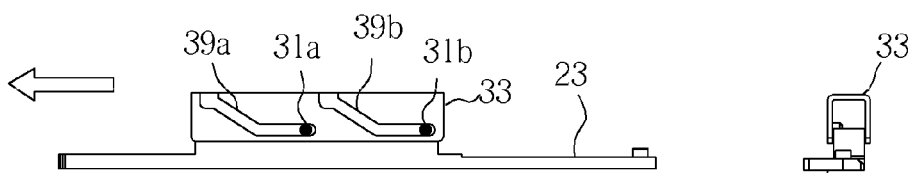
Figure 5:
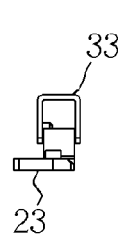
Figure 5:
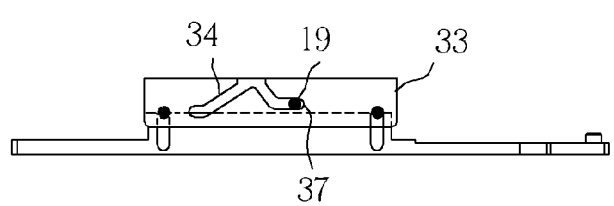

Please refer to FIG. 2, FIG. 3, FIG. 4, and FIG. 5. FIG. 5 is a diagram of motions of the lift device 30 according to the first embodiment of the present invention. As shown in FIG. 5(a), there is no optical disk in the slot-in disk drive 10 when the slot-in disk drive 10 is standby. The second sliding component 23 is close to the lateral side of slot-in disk drive 10. Because the guiding pins 38a and 38b insert into the two straight slots 32a and 32b respectively, the cover 33 can be driven along the two straight slots 32a and 32b of the second sliding component 23 so as to move close to the lateral side of the slot-in disk drive 10. Therefore, the sliding pins 31a and 31b are respectively located at top ends of the two lifting slots 39a and 39b and the two guiding pins 38a and 38b are located respectively at bottom ends of the two straight slots 32a and 32b for descending the cover 33 to a lowest height, and the sliding bolt 19 is located at the lowest standby portion 35 of the traverse slot 34, so that the traverse 12 and the cover 33 are descended for loading the optical disk.

As shown in FIG. 5(b), when the optical disk is loaded by the slot-in disk drive 10 to a predetermined position, the second sliding component 23 is driven by the guiding slot 26 of the first sliding component 22 so as to shift transversely along an arrow shown in FIG. 5(b). The two guiding pins 38a and 38b of the cover 33 are driven respectively along the two straight slots 32a and 32b of the second sliding component 23 toward the same direction as the arrow. The sliding pins 31a and 31b fixed on the base 14 are shifted respectively toward the bottom ends of the lifting slots 39a and 39b for ascending the cover 33, and the guiding pins 38a and 38b of the cover 33 are shifted upwardly along the two straight slots 32a and 32b, respectively. The cover 33 shifting along the arrow drives the sliding bolt 19 toward the wedged position 36 of the traverse slot 34. When the cover 33 is ascended to a highest position, the sliding bolt 19 is shifted to the wedged position 36 of the traverse slot 34, so that the optical disk can be wedged on the spindle motor 17 of the traverse 12.

As shown in FIG. 5(c), when the optical disk is wedged on the spindle motor 17, the cover 33 is driven continuously by the second sliding component 23 along an arrow shown in FIG. 5(c). The sliding pins 31a and 31b are shifted along the bottom ends of the lifting slots 39a and 39b for keeping the cover 33 at the same height. Then, the sliding bolt 19 is shifted toward the playing position 37 of the traverse slot 34, so that the traverse 12 can be descended for allowing the optical disk to rotate safely.

Figure 6:
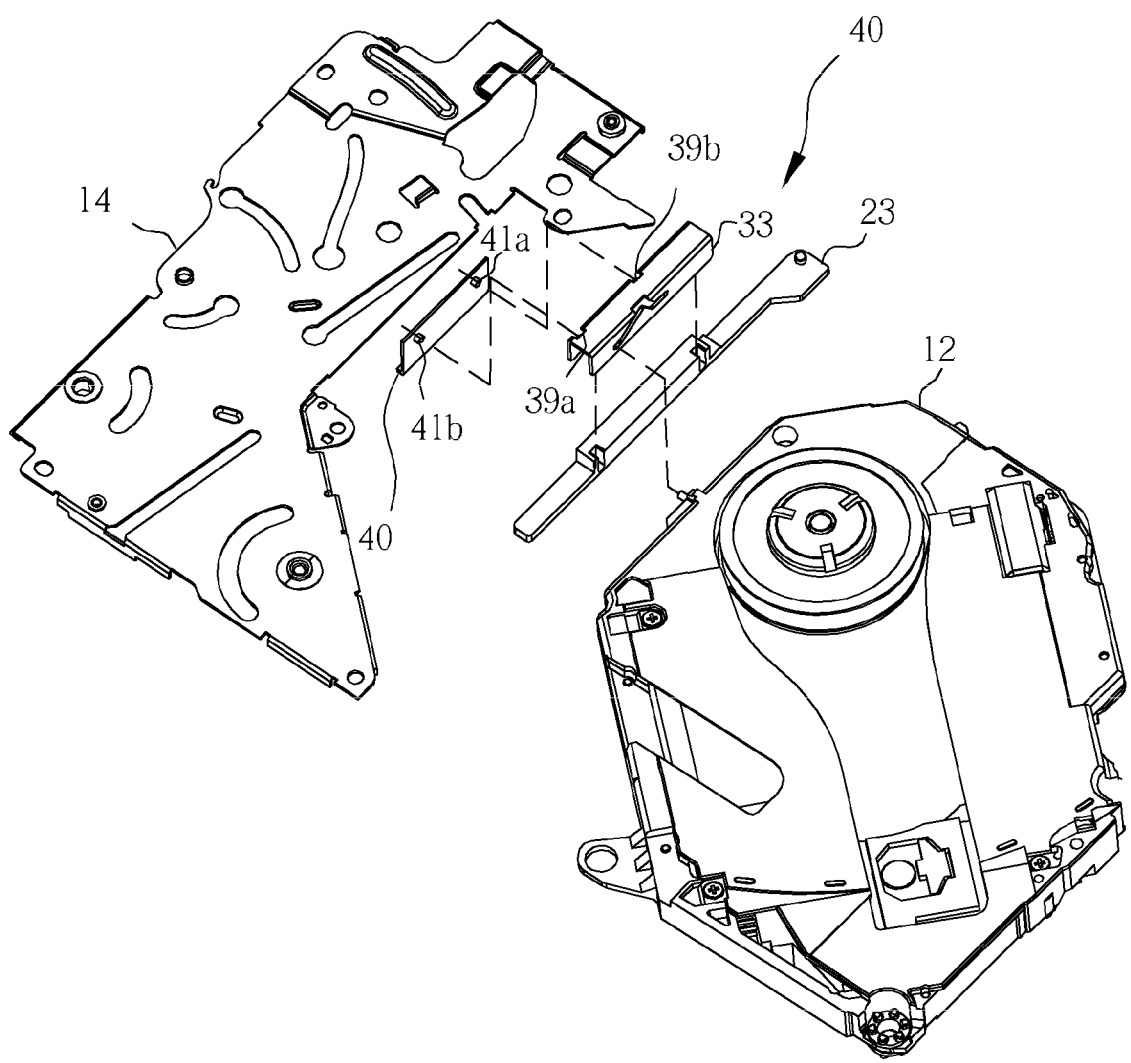
FIG. 6 is a diagram of a lift device according to a second embodiment of the present invention.

Please refer to FIG. 6. FIG. 6 is a diagram of a lift device 40 according to a second embodiment of the present invention. The basic structure of this embodiment is the same as the one of the first embodiment, and the detailed description is omitted herein for simplicity. Difference between the first embodiment and the second embodiment is that two sliding pins 41a and 41b protrude from the casing 11 instead of protruding from the base 14 of the first embodiment (As shown in FIG. 2). A fixing plate 42, which is located between the base 14 and the second sliding component 23, can protrude from a bottom of the casing 11 or can be integrated with the casing 11 monolithically. Two sliding pins 41a and 41b protrude from a side of the fixing plate 42 adjacent to a side of the second sliding component 23 opposite to the traverse 12 for inserting into the lifting slots 39a and 39b of the cover 33. Therefore, the second embodiment can utilize the casing 11 with high structural strength to support weight of the traverse 12 when the traverse 12 is ascended and descended, so that the traverse 12 can operate more smoothly.

In conclusion, the slot-in disk drive of the present invention can utilize the sliding component, whose height can be adjustable, to drive the cover for ascending and descending the traverse so as to prevent the sliding component from interfering the optical disk being loaded and ejected by the slot-in disk drive. The thickness of the slot-in disk drive can be decreased as benefit to mechanical design of inner disposition of the slot-in disk drive. In addition, the present invention can further utilize the base or the casing to support the cover, so that most weight of the traverse can be supported by the base or by the casing with high structural strength, and least weight of the traverse can be supported by the sliding component for sliding the sliding component smoothly.

Those skilled in the art will readily observe that numerous modifications and alterations of the device and method may be made while retaining the teachings of the invention.

What is claimed is:

1. A lift device installed inside a slot-in disk drive, the slot-in disk drive comprising a casing, a traverse pivoted to the casing, a sliding bolt protruding from a side of the traverse, a base installed inside the casing, and a sliding component installed beside the side of the traverse in a slidable manner, the lift device comprising:
   two straight slots being formed on a side of the sliding component separately and along a direction of thickness of the slot-in disk drive;
   two sliding pins separately protruding from a side of the base adjacent to the sliding component; and
   a cover covering with the sliding component, the cover comprising:
      two guiding pins protruding from an inner surface of the cover corresponding to the two straight slots for inserting into the two straight slots respectively;
      an one-humped traverse slot with two ends of different heights formed on a lateral side of the cover adjacent to the sliding bolt whereinto the sliding bolt inserts; and
      two lifting slots separately formed on the other lateral side of the cover whereinto the two sliding pins insert;
   wherein the two sliding pins are located at top ends of the two lifting slots and the sliding bolt is located at a bottom end of the traverse slot for descending the cover to a lowest height when the slot-in disk drive is standby.

2. The lift device of claim 1, wherein an end of the sliding component is driven by the other sliding component so as to be shifted transversely inside the casing.

3. The lift device of claim 1, wherein a cross-section of the cover is an overturned U-shape.

4. The lift device of claim 1, wherein a length of the cover is greater than a distance between the two straight slots.

5. The lift device of claim 1, wherein the bottom end of the traverse slot is a standby position of the slot-in disk drive, a middle of the traverse slot is a highest wedged position of the slot-in disk drive, and a top end of the traverse slot is a playing position of the slot-in disk drive.

6. The lift device of claim 1, wherein each lifting slot comprises a top end and a bottom end.

7. The lift device of claim 6, wherein the lifting slots are inclined L-shaped structures.

8. The lift device of claim 7, wherein bottom ends of the lifting slots keep the same height.

9. A lift device installed inside a slot-in disk drive, the slot-in disk drive comprising a casing, a traverse pivoted to the casing, a sliding bolt protruding from a side of the traverse, and a sliding component installed beside the side of the traverse in a slidable manner, the lift device comprising:
   two straight slots being formed on a side of the sliding component separately and along a direction of thickness of the slot-in disk drive;
   two sliding pins separately protruding from the casing adjacent to the other side of the sliding component opposite to the traverse; and
   a cover covering with the sliding component, the cover comprising:
      two guiding pins protruding from an inner surface of the cover corresponding to the two straight slots for inserting into the two straight slots respectively;
      an one-humped traverse slot with two ends of different heights formed on a lateral side of the cover adjacent to the sliding bolt whereinto the sliding bolt inserts; and
      two lifting slots separately formed on the other lateral side of the cover whereinto the two sliding pins insert;
   wherein the two sliding pins are located at top ends of the two lifting slots and the sliding bolt is located at a bottom end of the traverse slot for descending the cover to a lowest height when the slot-in disk drive is standby.

10. The lift device of claim 9, wherein a fixing plate protrudes from a bottom of the casing and the two sliding pins protrudes from the fixing plate adjacent to the other side of the sliding component opposite to the traverse.

11. The lift device of claim 10, wherein the fixing plate is integrated with the casing monolithically.

12. The lift device of claim 9, wherein a cross-section of the cover is an overturned U-shape.

13. The lift device of claim 9, wherein a length of the cover is greater than a distance between the two straight slots.

14. The lift device of claim 9, wherein each lifting slot comprises a top end and a bottom end.

15. The lift device of claim 14, wherein the lifting slots are inclined L-shaped structures.

16. The lift device of claim 15, wherein bottom ends of the lifting slots keep the same height.

* * * * *